(No Model.)

W. PETERING.
WAGON BRAKE.

No. 531,061. Patented Dec. 18, 1894.

WITNESSES:
Lester L. Allen.
A. McCarty.

INVENTOR
Wm Petering
BY
R. J. McCarty
ATTORNEY.

THE NORRIS PETERS CO., PHOTO-LITHO., WASHINGTON, D. C.

UNITED STATES PATENT OFFICE.

WILLIAM PETERING, OF CENTRE, OHIO.

WAGON-BRAKE.

SPECIFICATION forming part of Letters Patent No. 531,061, dated December 18, 1894.

Application filed August 24, 1894. Serial No. 521,205. (No model.)

*To all whom it may concern:*

Be it known that I, WILLIAM PETERING, of Centre, county of Montgomery, State of Ohio, have invented a new and useful Improvement in Wagon-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in wagon brakes, and is especially designed for use in hilly regions.

The object of the invention is to provide means that may be applied to any wagon; either old or new, whereby said wagon may be automatically locked on up grade, to relieve the horse from the weight of the load, when any sudden slacking up or a full stop is made.

Figure 1:
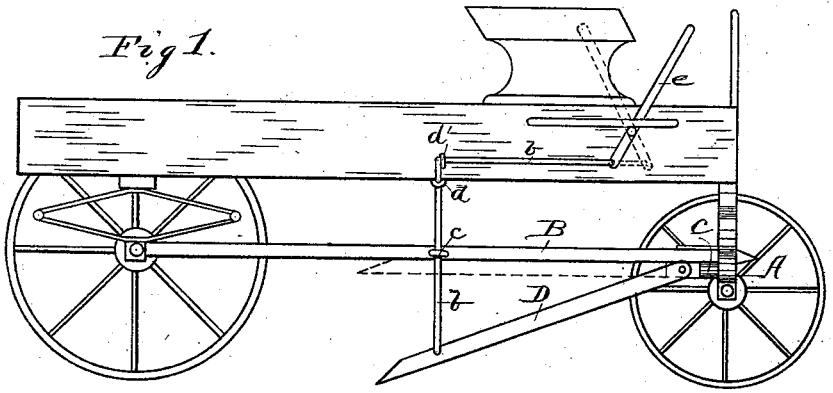
Figure 2:
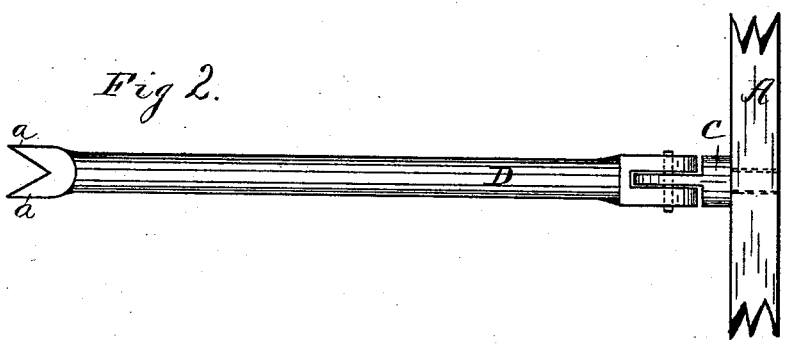

Referring to the annexed drawings which form a part of the specification, Figure 1, is a side elevation of a wagon having my device attached thereto; Fig. 2, an enlarged plan view of the attachment coupled to the front axle, the ends of the latter being broken away.

A— designates the front axle; B—, the coupling pole; C—, a coupling bolt which is rigidly attached to the center of the front axle by being screwed therein, or the connection may be made in any suitable way.

D— is a drag bar having the end that rests upon the ground provided with sharp points or teeth $(a)-(a)$, and its upper end bifurcated to receive the flat portion of the coupling bolt —C— to which said drag bar is pivoted. Both the coupling bolt —C— and the drag bar are made of iron, and the latter has sufficient weight to cause the teeth $(a)-(a)$ to readily engage with the ground upon any downward or backward movement of the wagon.

To remove the drag bar from the ground when the wagon is running on level ground, I provide a chain or rope $(b)$ attached to said drag bar, and passed through staples $(c)$ on the coupling pole; $(d)-(d')$ on the bottom and side of the wagon, and to the hand lever $(e)$ which is within reach of the driver. This rope is entirely out of the way therefore is only affected by the hand lever which may be operated by the driver to raise or lower the drag bar at the proper time.

Having described my invention, I claim—

In a wagon brake, the combination with a wagon body, and running gear; of a brake bar D provided with a forked end, pivoted to the front axle; a hand lever $(e)$ pivoted to the wagon body; and a rope attached to said hand lever, and to the lower end of said brake bar; said rope provided with guides on said wagon body, and on the coupling pole, as herein described.

In testimony whereof I have hereunto set my hand, this 20th day of August, 1894.

WILLIAM PETERING.

Witnesses:
R. J. MCCARTY,
S. A. DICKSON.